United States Patent
Yamano

(10) Patent No.: US 12,334,545 B2
(45) Date of Patent: Jun. 17, 2025

(54) ALL SOLID STATE BATTERY

(71) Applicant: TOYOTA JIDOSHA KABUSHIKI KAISHA, Toyota (JP)

(72) Inventor: Yuhi Yamano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 599 days.

(21) Appl. No.: 17/577,959

(22) Filed: Jan. 18, 2022

(65) Prior Publication Data

US 2022/0238864 A1 Jul. 28, 2022

(30) Foreign Application Priority Data

Jan. 28, 2021 (JP) ................. 2021-011659

(51) Int. Cl.
| | |
|---|---|
| *H01M 4/485* | (2010.01) |
| *H01M 4/36* | (2006.01) |
| *H01M 10/0525* | (2010.01) |
| *H01M 10/0562* | (2010.01) |
| *H01M 4/02* | (2006.01) |

(52) U.S. Cl.
CPC .......... *H01M 4/366* (2013.01); *H01M 4/485* (2013.01); *H01M 10/0525* (2013.01); *H01M 10/0562* (2013.01); *H01M 2004/021* (2013.01); *H01M 2004/027* (2013.01); *H01M 2300/0068* (2013.01)

(58) Field of Classification Search
CPC .................................................... H01M 4/485
See application file for complete search history.

(56) References Cited

U.S. PATENT DOCUMENTS

| | | | |
|---|---|---|---|
| 2019/0088926 A1 | 3/2019 | Takami et al. | |
| 2019/0198880 A1 | 6/2019 | Matsushita | |
| 2020/0083537 A1* | 3/2020 | Anandan | H01M 4/622 |

(Continued)

FOREIGN PATENT DOCUMENTS

| | | |
|---|---|---|
| CN | 109524619 A | 3/2019 |
| EP | 3599654 A1 | 1/2020 |

(Continued)

OTHER PUBLICATIONS

Machine translation of JP 2013134923 A from espacenet (Year: 2013).*

(Continued)

*Primary Examiner* — Nicholas A Smith
*Assistant Examiner* — Zackary Richard Cochenour
(74) *Attorney, Agent, or Firm* — Dinsmore & Shohl LLP

(57) ABSTRACT

A main object of the present disclosure is to provide an all solid state battery of which calorific value can be reduced while preventing internal short circuit from increasing. The present disclosure achieves the object by providing an all solid state battery comprising an anode active material layer and an anode current collector; wherein the anode current collector includes a coating layer containing an oxide active material and a conductive material, on a surface of the anode active material layer side; a ratio of a thickness of the coating layer with respect to a thickness of the anode active material layer is less than 20%; and a proportion of the conductive material in the coating layer is more than 0 weight % and less than 1.0 weight %.

5 Claims, 3 Drawing Sheets

(56) References Cited

U.S. PATENT DOCUMENTS

2020/0185768 A1 6/2020 Kang et al.
2020/0328465 A1 10/2020 Sakaida et al.

FOREIGN PATENT DOCUMENTS

| JP | 2008-305746 A | | 12/2008 | |
|----|---------------|---|---------|---|
| JP | 2013134923 A | * | 7/2013 | |
| JP | 2014199714 A | * | 10/2014 | ............ H01M 4/131 |
| JP | 2017-068911 A | | 4/2017 | |
| JP | 2018-142431 A | | 9/2018 | |
| KR | 2020-0128256 A | | 11/2020 | |
| WO | 2013/021630 A1 | | 2/2013 | |
| WO | 2019-135323 A1 | | 7/2019 | |

OTHER PUBLICATIONS

Machine translation of JP2014199714A from Espacenet (Year: 2014).*

Hayashi, Akitoshi, et al. "Development of Sulfide Solid Electrolytes and Interface Formation Processes for Bulk-Type All-Solid-State Li and Na Batteries." Frontiers, Jun. 16, 2016, https://www.frontiersin.org/articles/10.3389/fenrg.2016.00025/full#:~:text=Sulfide%20SEs%20have%20several%20adva (Year: 2016).*

Tian et al., Niobium doped lithium titanate as a high rate anode material for Li-ion batteries, Electrochimica Acta, vol. 55, Issue 19, 2010, pp. 5453-5458. (Year: 2010).*

* cited by examiner

ALL SOLID STATE BATTERY

CROSS-REFERENCE TO RELATED APPLICATIONS

This application is based upon and claims the benefit of priority of the prior Japanese Patent Applications No. 2021-011659 filed Jan. 28, 2021, the entire contents of which are incorporated herein by reference.

TECHNICAL FIELD

The present disclosure relates to an all solid state battery.

BACKGROUND ART

An all solid state battery is a battery including a solid electrolyte layer between a cathode active material layer and an anode active material layer, and one of the advantages thereof is that the simplification of a safety device may be more easily achieved compared to a liquid-based battery including a liquid electrolyte containing a flammable organic solvent.

As an anode active material with excellent capacity properties, a Si-based active material has been known. Patent Literature 1 discloses an anode for an all solid sulfide battery including at least one kind of materials selected from the group consisting of Si and a Si alloy as an anode active material.

Also, although it is not a technique relating to an all solid state battery, Patent Literature 2 discloses an anode for non-aqueous electrolyte secondary battery comprising a current collector, a first layer including lithium titanate, a second layer including a carbon material, wherein a ratio of the thickness $T_1$ of the first layer and the thickness $T_2$ of the second layer, which is the ratio $T_1/T_2$ is 0.15 or more and 0.55 or less. Patent Literature 3 discloses a battery comprising a solid electrolyte layer that includes a first electrolyte layer containing a halide electrolyte and a second electrolyte layer containing a sulfide solid electrolyte.

CITATION LIST

Patent Literatures

Patent Literature 1: Japanese Patent Application Laid-Open (JP-A) No. 2018-142431
Patent Literature 2: JP-A No. 2014-199714
Patent Literature 3: International Application Publication: WO 2019/135323

SUMMARY OF DISCLOSURE

Technical Problem

In a lithium ion battery having high energy density, the calorific value tends to increase on occasions such as when short circuit occurs. In Patent Literature 2, insulation during internal circuit is secured by arranging a high resistance layer between an anode mixture layer and an anode current collector. However, since an all solid state battery usually does not include a separating layer with current shutting function, the calorific value cannot be sufficiently reduced by just simply arranging a resistance layer. Meanwhile, there is a possibility that desired battery characteristics may not be maintained when focusing on just reducing the calorific value, since the internal short circuit tends to increase in that case.

The present disclosure has been made in view of the above circumstances, and a main object thereof is to provide an all solid state battery of which calorific value can be reduced while preventing internal short circuit from increasing.

Solution to Problem

In order to achieve the object, the present disclosure provides an all solid state battery comprising an anode active material layer and an anode current collector; wherein the anode current collector includes a coating layer containing an oxide active material and a conductive material, on a surface of the anode active material layer side; a ratio of a thickness of the coating layer with respect to a thickness of the anode active material layer is less than 20%; and a proportion of the conductive material in the coating layer is more than 0 weight % and less than 1.0 weight %.

According to the present disclosure, the coating layer containing an oxide active material and a conductive material is arranged between the anode current collector and the anode active material layer, the thickness of the coating layer with respect to the thickness of the anode active material layer is in the specified range, and the proportion of the conductive material in the coating layer is in the specified range, and thus the calorific value can be reduced while preventing the internal circuit from increasing in the all solid state battery.

In the disclosure, the ratio of the thickness of the coating layer with respect to the thickness of the anode active material layer may be 2% or more and 12% or less.

In the disclosure, the proportion of the conductive material in the coating layer may be 0.1 weight % or more and 0.5 weight % or less.

In the disclosure, the oxide active material may be lithium titanate.

In the disclosure, the oxide active material may be a niobium-titanium-based oxide.

In the disclosure, the coating layer may contain a binder.

In the disclosure, the anode active material layer may contain a sulfide solid electrolyte.

Effects of Disclosure

An all solid state battery in the present disclosure exhibits an effect such that the calorific value can be reduced while preventing internal short circuit from increasing.

DESCRIPTION OF EMBODIMENTS

The all solid state battery in the present disclosure is hereinafter explained in details with reference to drawings.

Each drawing described as below is a schematic view, and the size and the shape of each portion are appropriately exaggerated in order to be understood easily. Further, in each drawing, hatchings or reference signs are appropriately omitted. Furthermore, in the present description, upon expressing an embodiment of arranging one member with respect to the other member, when it is expressed simply "on" or "below", both of when the other member is directly arranged on or below the one member so as to contact with each other, and when the other member is arranged above or below the one member interposing an additional member, can be included unless otherwise described.

Figure 1:
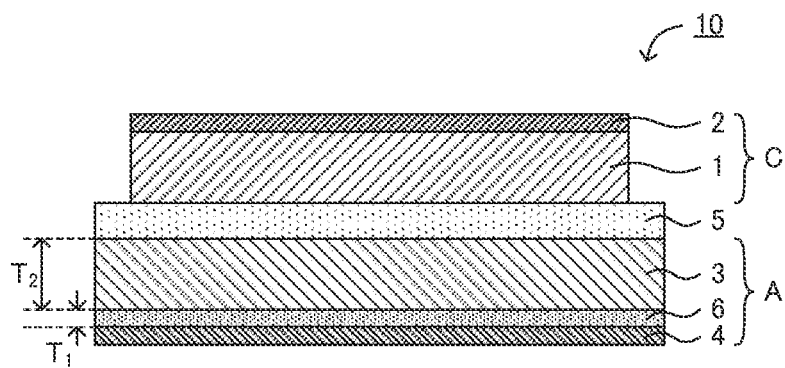
FIG. 1 is a schematic cross-sectional view exemplifying the all solid state battery in the present disclosure.

FIG. 1 is a schematic cross-sectional view exemplifying the all solid state battery in the present disclosure. All solid state battery 10 illustrated in FIG. 1 comprises cathode C including cathode active material layer 1 and cathode current collector 2, anode A including anode active material layer 3 and anode current collector 4, and solid electrolyte layer 5 arranged between the cathode active material layer 1 and the anode active material layer 3. In the present disclosure, the anode current collector 4 includes coating layer 6 containing an oxide active material and a conductive material, on a surface of the anode active material layer 3 side, and the proportion of the conductive material in the coating layer 6 is in the specified range. Further, the thickness $T_2$ of the anode active material layer 3 with respect to the thickness $T_1$ of the coating layer 6 is in the specified range.

According to the present disclosure, the coating layer containing an oxide active material and a conductive material is arranged between the anode current collector and the anode active material layer, the thickness of the coating layer with respect to the thickness of the anode active material layer is in the specified range, and the proportion of the conductive material in the coating layer is in the specified range, and thus the calorific value can be reduced while preventing the internal circuit from increasing in the all solid state battery. In specific, in the present disclosure, the coating layer containing the oxide active material and the conductive material is arranged between the anode current collector and the anode active material layer. The coating layer contains the conductive material, and thus an electron conducting path is formed by the conductive material, and the internal resistance can be prevented from increasing. In the oxide active material, electron conductivity appears when Li is intercalated, and insulation appears when the intercalated Li is desorbed. For this reason, the internal short circuit can be prevented from increasing by forming the electron conducting path using the electron conductivity of the oxide active material, even when the proportion of the conductive material is little. Meanwhile, Li is desorbed from the oxide active material when internal short circuit occurs, for example; thus, the calorific value can be reduced by shutting the electron conducting path using that insulation, which is shut-down function. Also, when the proportion of the conductive material included in the coating layer is in the specified range, the shut-down function promptly works at the time of short circuit, and thereby the calorific value can be further reduced. Also, when the ratio of the thickness of the coating layer with respect to the thickness of the anode active material layer is in the specified range, the increase of the internal resistance can be further prevented. In addition, when a sulfide solid electrolyte is used as a solid electrolyte of the all solid state battery, flammable gas due to exothermic reaction is more easily generated compared to when an oxide solid electrolyte or a chloride solid electrolyte is used. The all solid state battery in the present disclosure is particularly effective when a sulfide solid electrolyte is used since the reduction of the calorific value can be achieved.

1. Anode

The anode in the present disclosure includes an anode active material layer and an anode current collector. Also, the anode current collector includes a coating layer containing an oxide active material and a conductive material, on a surface of the anode active material layer side.

(1) Anode Current Collector

The anode current collector is a layer that collects currents of the anode active material layer. Examples of the anode current collector may include a metal current collector. Examples of the metal current collector may include a current collector including a metal such as Cu and Ni. The metal current collector may be a simple substance of the above described metal, and may be an alloy of the metal. Examples of the shape of the anode current collector may include a foil shape.

(2) Coating Layer

The coating layer is a layer to be arranged on a surface of the anode active material layer side of the anode current collector. In addition, the coating layer contains an oxide active material and a conductive material. The oxide active material usually has electron conductivity in the state Li is intercalated, and has insulation in the state where the intercalated Li is desorbed. The electron conductivity (25° C.) of the oxide active material in the state Li is intercalated is, for example, $8.0*10^{-1}$ S/cm or more. Meanwhile, the electron conductivity (25° C.) of the oxide active material in the state where the intercalated Li is desorbed is, for example, $2.1*10^{-6}$ S/cm or less.

The oxide active material contains at least a metal element and an oxygen element. In some embodiments, the oxide active material includes at least one of a layer structure and a spinel structure. Examples of the oxide active material may include lithium titanate. The lithium titanate is a compound containing Li, Ti and O, and examples thereof may include $Li_4Ti_5O_{12}$, $Li_4TiO_4$, $Li_2TiO_3$ and $Li_2Ti_3O_7$. Another example of the oxide active material may be a niobium-titanium-based oxide. The niobium-titanium-based oxide is a compound containing Ti, Nb and O, and examples thereof may include $TiNb_2O_7$ and $Ti_2Nb_{10}O_{29}$. The coating layer may contain just one kind of the oxide active material, and may contain two kinds or more thereof. In some embodiments, the Li intercalation and desorption potential of the oxide active material is higher than that of the anode active material.

Examples of the shape of the oxide active material may include a granular shape. The average particle size ($D_{50}$) of the oxide active material is not particularly limited, but for example, it is 10 nm or more, and may be 100 nm or more. Meanwhile, the average particle size ($D_{50}$) of the oxide active material is, for example, 50 μm or less, and may be 20 μm or less. The proportion of the oxide active material in the coating layer is, for example, 50 weight % or more, may be 70 weight % or more, and may be 90 weight % or more.

The coating layer contains a conductive material in the specified range. Examples of the conductive material may include a carbon material, a metal particle, and a conductive polymer. Examples of the carbon material may include a particulate carbon material such as carbon blacks like acetylene black (AB) and Ketjen black (KB), and a fiber carbon material such as carbon fiber, carbon nanotube (CNT), and carbon nanofiber (CNF). An electron conducting path is formed by adding the conducive material, and thus the increase in internal resistance can be prevented. The proportion (content) of the conductive material in the coating layer is, usually more than 0 weight %, may be 0.1 weight % or more, and may be 0.3 weight % or more. Meanwhile, the proportion of the conductive material in the coating layer is, usually less than 1.0 weight %, and may be 0.5 weight % or less. If the proportion of the conductive material is too much, the conductive material inhibits the shut-down function at the time of short circuit, and the calorific value cannot be reduced.

In the present disclosure, $T_1$ designates the thickness of the coating layer, and $T_2$ designates the thickness of the anode active material layer.

Incidentally, the unit of $T_1$ and $T_2$ is μm. The ratio of $T_1$ with respect to $T_2$, which is $T_1/T_2$ is, usually less than 20%, may be 12% or less, and may be 6% or less. If the $T_1/T_2$ is too large, the internal resistance easily increases. Meanwhile, the ratio of $T_1$ with respect to $T_2$, which is $T_1/T_2$ is, usually more than 0%, and may be 2% or more.

The $T_1$ is, for example, 1 μm or more and may be 3 μm or more. Meanwhile, the $T_1$ is, for example, 15 μm or less and may be 6 μm or less. The $T_2$ is, for example, 20 μm or more and may be 50 μm or more. Meanwhile, the $T_2$ is, for example, 200 μm or less and may be 150 μm or less.

The coating layer may contain a solid electrolyte. In this case, excellent ion conducting path is formed in the coating layer, and thus the shut-down function promptly works and the calorific value can be further reduced thereby. The solid electrolyte is in the same contents as those described in "1. Anode (3) Anode active material layer" later; thus, the descriptions herein are omitted. The proportion of the solid electrolyte in the coating layer is, for example, 5 volume % or more, and may be 10 volume % or more. If the proportion of the solid electrolyte is too little, the effect of reducing the calorific value by the solid electrolyte may not be easily obtained. Meanwhile, the proportion of the solid electrolyte in the coating layer is, for example, 30 volume % or less. If the proportion of the solid electrolyte is too much, the internal resistance easily increases. Also, the coating layer may not contain a solid electrolyte. In this case, the increase in the internal resistance is easily prevented.

In some embodiments, the coating layer contains a binder. Addition of the binder improves the adhesiveness of the coating layer, and the adherence of the anode active material layer and the anode current collector improves. Examples of the binder may include a fluoride-based binder, a polyimide-based binder and a rubber-based binder. The proportion of the binder in the coating layer is, for example, 1 weight % or more and 10 weight % or less.

(3) Anode Active Material Layer

The anode active material layer contains at least an anode active material, and may further contain at least one of a solid electrolyte, a conductive material and a binder.

The anode active material layer contains at least an anode active material. There are no particular limitations on the kind of the anode active material, and examples thereof may include a metal active material and a carbon active material. Examples of the metal active material may include an active material including a metal such as Si, Sn, Li, In and Al. The metal active material may be a simple substance of the above described metal, may be an alloy of the metal, and may be an oxide of the metal. Examples of the metal active material including Si may include a simple substance of Si, a Si alloy (such as an alloy mainly composed of Si) and Si oxide. Meanwhile, examples of the carbon active material may include mesocarbon microbeads (MCMB), highly oriented pyrolytic graphite (HOPG), hard carbon, and soft carbon.

Examples of the shape of the anode active material may include a granular shape. The average particle size ($D_{50}$) of the anode active material is not particularly limited, but for example, it is 10 nm or more, and may be 100 nm or more. Meanwhile, the average particle size ($D_{50}$) of the anode active material is, for example, 50 μm or less, and may be 20 μm or less. The average particle size ($D_{50}$) may be calculated from, for example, a measurement with a laser diffraction particle distribution meter or a scanning electron microscope (SEM).

The proportion of the anode active material in the anode active material layer is, for example, 20 weight % or more, may be 40 weight % or more, and may be 60 weight % or more. Meanwhile, the proportion of the anode active material is, for example, 80 weight % or less.

The anode active material layer may contain a solid electrolyte. Examples of the solid electrolyte may include an inorganic solid electrolyte such as a sulfide solid electrolyte, an oxide solid electrolyte, a nitride solid electrolyte, and a halide solid electrolyte. In some embodiments, the sulfide solid electrolyte is used.

Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element. The sulfide solid electrolyte may be glass (amorphous), and may be a glass ceramic. Examples of the sulfide solid electrolyte may include $Li_2S$—$P_2S_5$, $LiI$—$Li_2S$—$P_2S_5$, $LiI$—$LiBr$—$Li_2S$—$P_2S_5$, $Li_2S$—$SiS_2$, $Li_2S$—$GeS_2$, and $Li_2S$—$P_2S_5$—$GeS_2$.

The conductive material and the binder to be used in the anode active material layer are in the same contents as those described in "1. Anode (2) Coating layer" above; thus, the descriptions herein are omitted.

2. Cathode

The cathode in the present disclosure includes a cathode active material layer and a cathode current collector. The cathode active material layer is a layer containing at least a cathode active material. Also, the cathode active material layer may contain at least one of a conductive material, a solid electrolyte, and a binder, as required.

Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$ and $Li(Ni_{0.5}Mn_{1.5})O_4$; and an olivine type active material such as $LiFePO_4$, $LiMnPO_4$, $LiNiPO_4$, and $LiCoPO_4$.

A protective layer containing Li-ion conductive oxide may be formed on the surface of the oxide active material. The reason therefor is to inhibit the reaction of the oxide active material and the solid electrolyte. Examples of the Li-ion conductive oxide may include $LiNbO_3$. The thickness of the protective layer is, for example, 1 nm or more and 30 nm or less. Also, as the cathode active material, for example, $Li_2S$ can be used.

Examples of the shape of the cathode active material may include a granular shape. The average particle size ($D_{50}$) of the cathode active material is not particularly limited, but for example, it is 10 nm or more, and may be 100 nm or more. Meanwhile, the average particle size ($D_{50}$) of the cathode active material is, for example, 50 μm or less, and may be 20 μm or less.

The conductive material, the solid electrolyte and the binder to be used in the cathode active material layer are in the same contents as those described in "1. Anode" above; thus, the descriptions herein are omitted. The thickness of the cathode active material layer is, for example, 0.1 µm or more and 1000 µm or less. Also, examples of the material for the cathode current collector may include SUS, aluminum, nickel, iron, titanium and carbon.

3. Solid Electrolyte Layer

The solid electrolyte layer in the present disclosure is a layer arranged between the cathode active material layer and the anode active material layer, and contains at least a solid electrolyte. In some embodiments, the solid electrolyte layer contains a sulfide solid electrolyte as the solid electrolyte. Also, the solid electrolyte layer may contain a binder. The solid electrolyte and the binder to be used in the solid electrolyte layer are in the same contents as those described in "1. Anode" above; thus, the descriptions herein are omitted. The thickness of the solid electrolyte layer is, for example, 0.1 µm or more and 1000 µm or less.

4. All Solid State Battery

The all solid state battery in the present disclosure comprises at least one power generation unit including a cathode active material layer, a solid electrolyte layer and an anode active material layer, and may comprises two or more of the unit. When the all solid state battery comprises a plurality of the power generation unit, they may be connected in parallel and may be connected in series. The all solid state battery in the present disclosure includes an outer package for storing the cathode, the solid electrolyte layer, and the anode. There are no particular limitations on the kind of the outer package, but examples thereof may include a laminate outer package.

The all solid state battery in the present disclosure may include a restraining jig that applies a restraining pressure along with the thickness direction with respect to the cathode, the solid electrolyte layer, and the anode. Excellent ion conducting path and electron conducting path may be formed by applying the restraining pressure. The restraining pressure is, for example, 0.1 MPa or more, may be 1 MPa or more, and may be 5 MPa or more. Meanwhile, the restraining pressure is, for example, 100 MPa or less, may be 50 MPa or less, and may be 20 MPa or less.

The all solid state battery in the present disclosure is typically an all solid lithium ion secondary battery. There are no particular limitations on the application of the all solid state battery, and examples thereof may include a power source for vehicles such as hybrid electric vehicles, battery electric vehicles, fuel cell electric vehicles and diesel powered automobiles. In some embodiments, it is used as a power source for driving hybrid electric vehicles and battery electric vehicles. Also, the all solid state battery in the present disclosure may be used as a power source for moving bodies other than vehicles (such as rail road transportation, vessel and airplane), and may be used as a power source for electronic products such as information processing equipment.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Comparative Example 1

<Production of Anode>

An anode active material (graphite particle, average particle size: 7 µm), a sulfide solid electrolyte (10LiI-15LiBr-75(0.75Li$_2$S-0.25P$_2$S$_5$), average particle size: 0.5 µm), and a binder (PVdF) were prepared. These were weighed so as to be the anode active material:the sulfide solid electrolyte:the binder=59.1:39.1:1.8 in the weight ratio, and mixed together with a dispersion medium (heptane). The obtained mixture was dispersed by an ultrasonic homogenizer (UH-50 from SMT Corporation) to obtain anode slurry. The obtained anode slurry was pasted on an anode current collector (Ni foil) and dried in the conditions of 100° C. and 30 minutes. After that, the product was punched out into a size of 1 cm$^2$, and thereby an anode including an anode active material layer and the anode current collector was obtained. The thickness of the anode active material layer was 50 µm.

<Production of Cathode>

A cathode active material (LiNi$_{1/3}$Co$_{1/3}$Mn$_{1/3}$O$_2$ coated with LiNbO$_3$), a sulfide solid electrolyte (10LiI-15LiBr-75 (0.75Li$_2$S-0.25P$_2$S$_5$)), a conductive material (VGCF) and a binder (PVdF) were prepared. These were weighed so as to be the cathode active material:the sulfide solid electrolyte:the conductive material:the binder=84.7:13.4:1.3:0.6 in the weight ratio, and mixed together with a dispersion medium (heptane). The obtained mixture was dispersed by an ultrasonic homogenizer (UH-50 from SMT Corporation) to obtain cathode slurry. The obtained cathode slurry was pasted on a cathode current collector (an aluminum foil) and dried in the conditions of 100° C. and 30 minutes. After that, the product was punched out into the size of 1 cm$^2$, and thereby a cathode including a cathode active material layer and the cathode current collector was obtained. The thickness of the cathode active material layer was 81 µm.

<Production of Solid Electrolyte Layer>

A sulfide solid electrolyte (10LiI-15LiBr-75(0.75Li$_2$S-0.25P$_2$S$_5$)) was put in a cylindrical ceramic having the inner diameter cross-sectional area of 1 cm$^2$, pressed at 4 ton/cm$^2$, and thereby a solid electrolyte layer (thickness: 15 µm) was obtained.

<Production of Evaluation Cell>

The cathode was placed on one surface of the solid electrolyte layer and pressed at 1 ton/cm$^2$ (approximately 98 MPa). Next, the anode was placed on the other surface of the solid electrolyte layer and pressed at 4 ton/cm$^2$ (approximately 392 MPa). Thereby, an all solid state battery cell for evaluation was obtained.

Comparative Example 2

<Production of Anode Current Collector Including Coating Layer>

As shown in Table 1, a conductive material (carbon black, D$_{50}$:2 µm) as a main component of coating material, and a binder (SBR) were prepared. The conductive material and the binder were weighed so as to be the conductive material: the binder=95:5 in the weight ratio, and mixed together with a dispersion medium (diisobutyl keton). The obtained mixture was dispersed by an ultrasonic homogenizer (UH-50 from SMT Corporation) to obtain slurry for coating layer. The obtained slurry for coating layer was pasted on an anode current collector (Ni foil) and dried in the conditions of 100° C. and 30 minutes. Thereby, an anode current collector including a coating layer (thickness: 3 µm) was obtained.

The ratio of the thickness $T_1$ (3 μm) of the coating layer with respect to the thickness $T_2$ (50 μm) of the anode active material layer, $T_1/T_2$ was 6%.

An evaluation cell was obtained in the same manner as in Comparative Example 1, except that the obtained current collector (the anode current collector including the coating layer) was used as the anode current collector and the cathode content was adjusted. Regarding the cathode content, for the intercalation of Li to the oxide anode active material inside the coating layer during the initial charge, capacity for just that content was increased and adjusted.

Comparative Examples 3 to 8 and Examples 1 to 6

A main component of coating material having an average particle size shown in Table 1, a binder (SBR), and a conductive material (carbon back, $D_{50}$:30 nm) were prepared. The main component of coating material and the binder were weighed so as to be the main component of coating material:the binder=95:5 in the weight ratio, and the conductive material was further weighed so that the proportion of the conductive material in the coating layer respectively became the amount shown in Table 1, and mixed together with a dispersion medium (diisobutyl keton). The obtained mixture was dispersed by an ultrasonic homogenizer (UH-50 from SMT Corporation) to obtain slurry for coating layer. An anode current collector including a coating layer having the thickness $T_1$ shown in Table 1 was respectively produced in the same manner as in Comparative Example 2, except that the obtained slurry for coating layer was respectively used. An evaluation cell was respectively obtained in the same manner as in Comparative Example 2, except that the obtained current collector (the anode current collector including the coating layer) was respectively used as the anode current collector and the cathode content was respectively adjusted.

[Evaluation]

Nail penetration test and charge and discharge test shown below were conducted to the evaluation cells obtained in Examples 1 to 6 and Comparative Examples 1 to 8 for evaluations.

<Nail Penetration Test>

Evaluation cells obtained in Examples 1 to 6 and Comparative Examples 1 to 8 were charged and nail penetration tests were conducted. The charge conditions were constant current (CC) charge (current value ⅓ C, charge termination voltage 4.2 V) and constant voltage (CV) charge (voltage value 4.2 V, current value 40 A). Then, an iron nail having 1.0 mm diameter was penetrated to the evaluation cell from the side surface at the speed of 0.1 mm/sec until the depth of 0.8 mm during 4.2 V CV charge to cause internal short circuit. The flow-in current was measured from the voltage drop for the evaluation cell and the power source, and the calorific value calculated therefrom was respectively obtained. Also, the calorific value and the flow-in time were multiplied (calorific value*flow-in time (s)), and the integrated calorific value was calculated. The results are shown in Table 1. Incidentally, the integrated calorific value shown in Table 1 is a relative value when Comparative Example 1 is 1.00.

<Charge and Discharge Test and Internal Resistance Evaluation>

Charge and discharge tests were conducted to the evaluation cells obtained in Examples 1 to 6 and Comparative Examples 1 to 8. In specific, the evaluation cell was respectively restrained in constant rate at the restraining pressure of 5 MPa, and CC-CV charged until 4.2 V at 0.333 mA. After that, the evaluation cell was respectively CC-CV discharged until 3.0 V at 0.333 mA. Then, the evaluation cell was respectively charged again. The charge on this occasion was referred to as the initial charge.

Internal resistance evaluations were conducted to the evaluation cells obtained in Examples 1 to 6 and Comparative Examples 1 to 8. In specific, after the initial charge and discharge, the OCV of the evaluation cell was respectively adjusted to 3.7 V, and then the cell was discharged for 5 seconds at 7 mA; the voltage at that time was respectively measured. The internal resistance was respectively obtained from the voltage change from the OCV. The results are shown in Table 1. Incidentally, the internal resistance shown in Table 1 is a relative value when Comparative Example 1 is 1.00.

TABLE 1

|  | Main component of coating material | Average particule size $D_{50}$ [μm] | $T_1$ [μm] | $T_1/T_2$ [%] | Conductive material content [Weight %] | Integrated calorific value (vs. Comp. Ex.1) | Internal resistance (vs. Comp. Ex.1) |
|---|---|---|---|---|---|---|---|
| Comp. Ex. 1 | — | — | — | — | — | 1.0 | 1.0 |
| Comp. Ex. 2 | Carbon | 2 | 3 | 6 | 95 | 1.13 | 0.94 |
| Comp. Ex. 3 | $Al_2O_3$ | 0.7 | 3 | 6 | 5 | 0.98 | 2.3 |
| Comp. Ex. 4 | $Li_4Ti_5O_{12}$ | 0.7 | 3 | 6 | 0 | 0.7 | 1.1 |
| Comp. Ex. 5 | $Li_4Ti_5O_{12}$ | 0.7 | 3 | 6 | 1 | 1.43 | 0.95 |
| Comp. Ex. 6 | $Li_4Ti_5O_{12}$ | 0.7 | 3 | 6 | 2 | 1.44 | 0.95 |
| Comp. Ex. 7 | $Li_4Ti_5O_{12}$ | 0.7 | 10 | 20 | 0.3 | 0.73 | 1.4 |
| Comp. Ex. 8 | $Li_4Ti_5O_{12}$ | 0.7 | 15 | 30 | 0.3 | 0.69 | 1.8 |
| Example 1 | $Li_4Ti_5O_{12}$ | 0.7 | 3 | 6 | 0.1 | 0.71 | 1.0 |
| Example 2 | $Li_4Ti_5O_{12}$ | 0.7 | 1 | 2 | 0.3 | 0.96 | 0.95 |
| Example 3 | $Li_4Ti_5O_{12}$ | 0.7 | 3 | 6 | 0.3 | 0.73 | 0.96 |
| Example 4 | $Li_4Ti_5O_{12}$ | 0.7 | 6 | 12 | 0.3 | 0.7 | 0.99 |
| Example 5 | $Li_4Ti_5O_{12}$ | 0.7 | 3 | 6 | 0.5 | 0.95 | 0.94 |
| Example 6 | $TiNb_2O_7$ | 0.5 | 3 | 6 | 0.3 | 0.72 | 0.97 |

Figure 2:
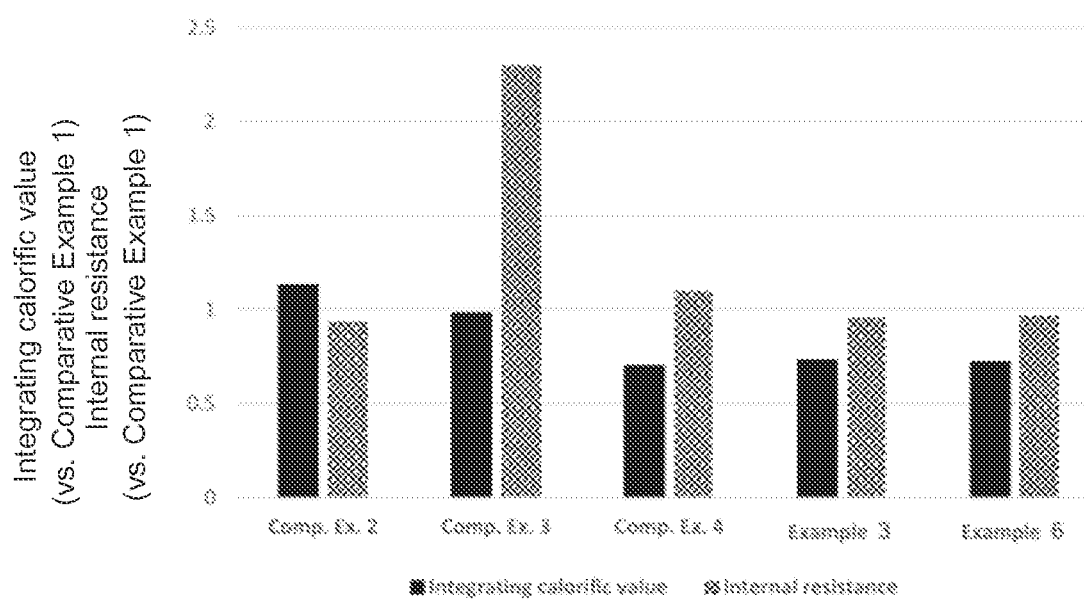
FIG. 2 is the results of nail penetration tests and internal resistance evaluations of the evaluation cells obtained in Comparative Examples 2, 3, 4, and Examples 3 and 6.

The results of nail penetration tests and internal resistance evaluations to the evaluation cells obtained in Comparative Examples 2, 3, 4 and Examples 3 and 6 are shown together in FIG. 2. As shown in FIG. 2, in Comparative Example 2, decrease in internal resistance was observed, but it was confirmed that the reduction effect of the integrated calorific value was not obtained. This shows that the carbon coating did not have the calorific value reduction effect. Meanwhile, the integrated calorific value of Comparative Example 3 decreased, but it was confirmed that the internal resistance was high. This shows that the battery properties were degraded when $Al_2O_3$ was used as a coating material since it has insulation. Decrease in the integrated calorific value was observed in Comparative Example 4, but it was confirmed that the internal resistance was high. It is presumed that the integrated calorific value decreased since the electron conductivity of the current collector was lost when the structure of $Li_4Ti_5O_{12}$ changed, which was when Li dropped off during short circuit, and its conductivity changed to insulation. Meanwhile, although the battery properties were not easily deteriorated during charge and discharge for its electron conductivity, the resistance of Comparative Example 4 presumably increased since the conductive material was not included and $Li_4Ti_5O_{12}$ took the role of electron conductivity.

In Examples 3 and 6, in addition to the integrated calorific value restraining effect of Comparative Example 4, it was confirmed that the internal resistance reduction effect was obtained from the effect of adding a little amount of conductive material. This effect can be obtained from oxide anode active materials of which conductivity changes to insulation when Li is desorbed, thus, the equivalent effect can be confirmed in both $Li_4Ti_5O_{12}$ and $TiNb_2O_7$.

Figure 3:
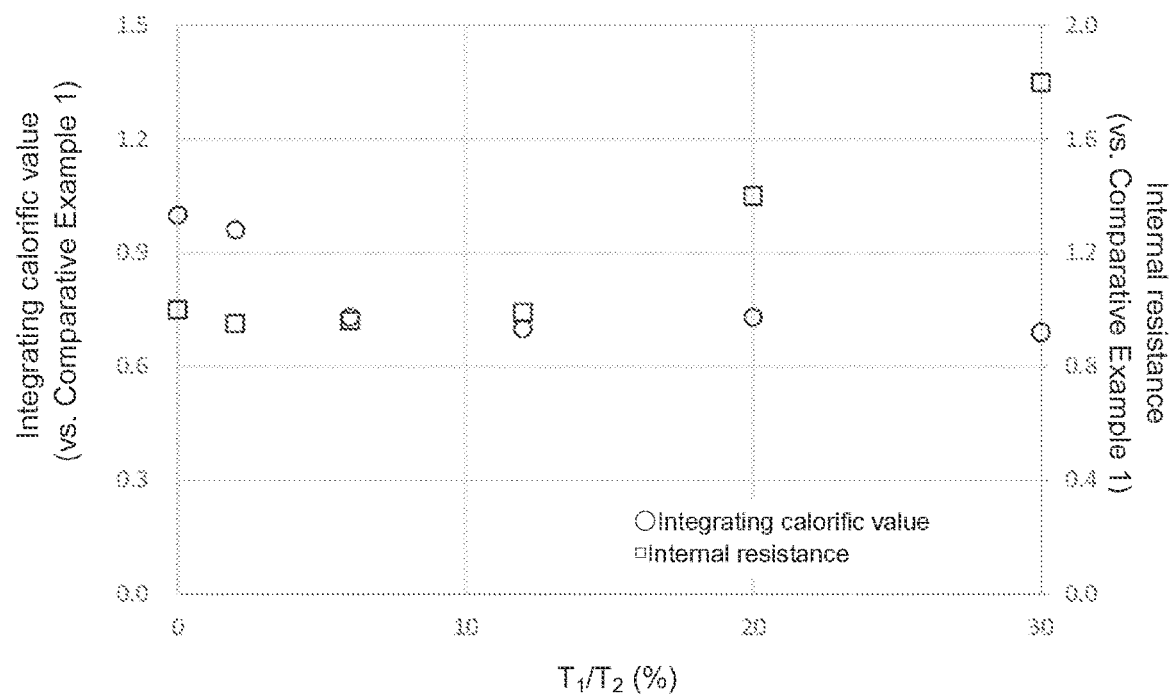
FIG. 3 is the results of nail penetration tests and internal resistance evaluations of the evaluation cells obtained in Comparative Examples 1, 7, 8, and Examples 2 to 4.

The results of the nail penetration tests and internal resistance evaluations to the evaluation cells obtained in Comparative Examples 1, 7, 8, and Examples 2 to 4 are shown together in FIG. 3 for evaluating the affect of the thickness of the coating layer with respect to the thickness of the anode active material layer. Incidentally, the proportion of the conductive material (carbon black) in the coating layer was 0.3 weight % in all Comparative Examples 7, 8 and Examples 2 to 4.

As shown in FIG. 3, when the ratio of the thickness of the coating layer with respect to the thickness of the anode active material layer was less than 20%, the thicker the coating layer was, the more the integrated calorific value during short circuit decreased, but when the ratio of the thickness of the coating layer with respect to the thickness of the anode active material layer was 20% or more, the integrated calorific value did not change. Also, when the ratio of the thickness of the coating layer with respect to the thickness of the anode active material layer was 20% or more, the internal resistance only increased. In particular, it was confirmed that the ratio of the thickness of the coating layer with respect to the thickness of the anode active material layer was 2% or more and 12% or less.

Figure 4:
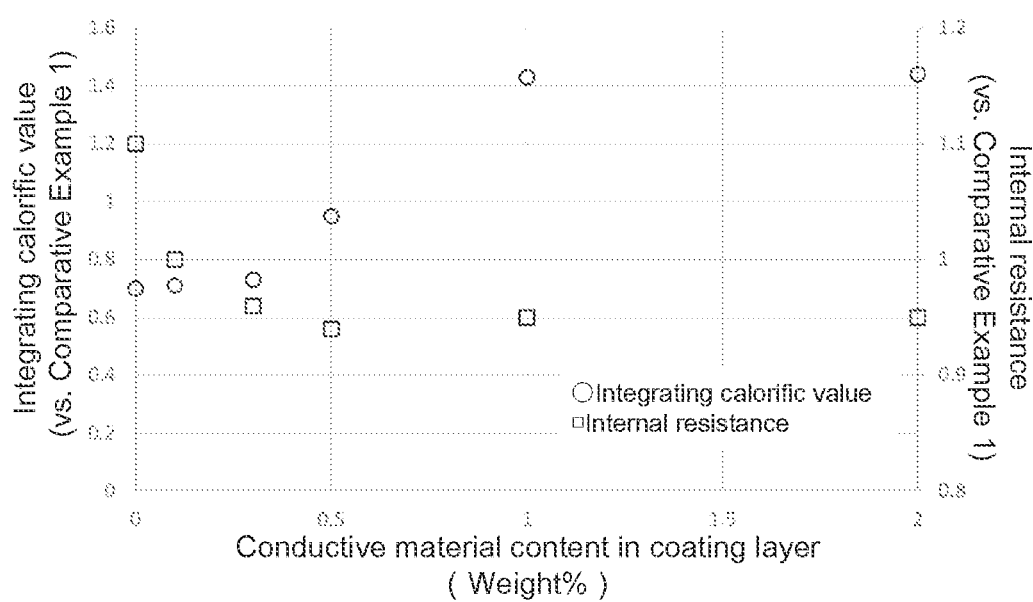
FIG. 4 is the results of nail penetration tests and internal resistance evaluations of the evaluation cells obtained in Comparative Examples 4, 5, 6, and Examples 1, 3 and 5.

The results of the nail penetration tests and internal resistance evaluations to the evaluation cells obtained in Comparative Examples 4, 5, 6 and Examples 1, 3 and 5 are shown together in FIG. 4 for evaluating the affect of the proportion of the conductive material in the coating layer. Incidentally, the ratio of the thickness of the coating layer with respect to the anode active material layer was 6% in all Comparative Examples 4, 5, 6, and Examples 1, 3, and 5. Addition of the conductive material into the coating layer forms an electron conducting path by the conductive material and the increase in battery resistance may be inhibited thereby. However, when the addition amount is 1.0 weight % or more, the integrated calorific value drastically increased and the significant effect could not be obtained. This is because the conductive material in the coating layer inhibits shutting off of the current during short circuit. In some embodiments, it was confirmed that the proportion of the conductive material in the coating layer was 0.1 weight % or more and 0.5 weight % or less.

REFERENCE SIGNS LIST

1 cathode active material layer
2 cathode current collector
3 anode active material layer
4 anode current collector
5 solid electrolyte layer
6 coating layer
10 all solid state battery

What is claimed is:

1. An all solid state battery comprising an anode active material layer and an anode current collector; wherein
   the anode current collector includes a coating layer containing an oxide active material and a conductive material, on a surface of the anode active material layer side;
   a ratio of a thickness of the coating layer with respect to a thickness of the anode active material layer is 6% or more and 12% or less;
   a proportion of the conductive material in the coating layer is 0.3 weight %; and
   the oxide active material is lithium titanate or a niobium-titanium-based oxide.

2. The all solid state battery according to claim 1, wherein the coating layer contains a binder.

3. The all solid state battery according to claim 1, wherein the anode active material layer contains a sulfide solid electrolyte.

4. The all solid state battery according to claim 1, wherein the ratio of the thickness of the coating layer with respect to the thickness of the anode active material layer is 6%.

5. The all solid state battery according to claim 4, wherein the oxide active material is the niobium-titanium-based oxide.

\* \* \* \* \*